Patented July 19, 1949

2,476,824

UNITED STATES PATENT OFFICE 2,476,824

TACKY SYNTHETIC RUBBER COMPOSITIONS

Harry E. Albert, Akron, Ohio, assignor to The Firestone Tire & Rubber Company, Akron, Ohio, a corporation of Ohio No Drawing. Application April 1, 1946, Serial No. 658,886

17 Claims. (Cl. 260—43)

This invention relates to synthetic rubber compositions. More particularly, it relates to uncured copolymers of a conjugated diene and vinyl aromatic compound which include as a tackifier a reaction product of an aldehyde and an alkylphenol. The composition may also advantageously include a softener and zinc rosinate or the like.

The uncured compositions of natural rubber used in the manufacture of tires, etc., are inherently tacky. When tread stock or a fabric coated with natural rubber is pressed against itself or other like stock, the two adhere so that a tire or the like assembled from uncured rubber parts can be readily assembled and can withstand the rough handling which such an article necessarily receives before being cured in a modern tire factory.

One of the difficulties encountered in the substitution of GR-S and the like for natural rubber has been the lack of tack which such materials possess. Plies of fabric treated with such a rubber, when pressed to one another, do not readily adhere. As a result, GR-S tires have been difficult to build, and ply separation has been a common fault in the synthetic tires produced from GR-S, due to this cause.

According to this invention a tackifier is compounded with the rubber-like copolymer. It may advantageously be added to the latex resulting from copolymerization in an emulsion. The tackifier is the reaction product of an aliphatic aldehyde containing from one to not more than four carbon atoms per molecule with a phenol which contains in the ortho or para position a non-aromatic hydrocarbon radical containing about three to about eight carbon atoms. Such phenols include:

p-cyclohexylphenol
p-sec-butylphenol
p-tert-butylphenol
p-n-butylphenol
p-tert-amylphenol
p-neopentylphenol
p-isoamylphenol
p-(2-pentyl) phenol
p-(3-pentyl) phenol
p-(1,1-dimethylpentyl) phenol
p-(1,1-dimethylbutyl) phenol
p-(1,1,3,3-tetramethylbutyl) phenol
p-(2-heptyl) phenol
p-(3-heptyl) phenol
p-isopropylphenol
o-amylphenol
o-butylphenol
o-(2-heptyl) phenol
o-cyclohexylphenol Examples of such aldehydes include formaldehyde, acetaldehyde, propionaldehyde, butyraldehyde, isobutyraldehyde, crotonaldehyde, and polymeric materials which form one or more of these aldehydes during the course of the reaction, such as trioxymethylene, paraformaldehyde, and paraldehyde.

Although the invention will be described more particularly as it relates to the use of tackifiers in the rubber-like copolymer of butadiene and styrene known as GR-S, the invention is not limited thereto but includes the addition of tackifiers of the type defined in a rubber-like copolymer of a conjugated diene—for example, butadiene, isoprene, 2-cyanobutadiene, cyclopentadiene, piperylene, dimethylbutadiene, etc.—and a vinyl aromatic compound—for example, styrene, alpha-methylstyrene, nuclear-substituted styrenes, monochlorostyrene, dichlorostyrene, vinylnaphthalene, vinylbiphenyl, vinylcarbazole, etc.

It has been found that the tack obtained is increased by compounding a softener of the usual type, such as dipentene, pine tar, a coal-tar oil or the like, with the copolymer. Zinc rosinate or other zinc, iron, calcium or cadmium salt of an acid of the class consisting of rosin acids, hydrogenated rosin acids, and dehydrogenated rosin acids, calcium rosinate, cadmium rosinate, the zinc salt of tall oil acids, etc., likewise, increase the tack of the uncured composition.

The following examples are illustrative of the preparation and use of the reaction products. The solid, higher molecular-weight compounds, such as those produced with a relatively higher ratio of aldehyde to phenol, are much better tackifiers than the liquid and syrupy lower molecular-weight compounds. Thus, those reaction products are preferred which are solid or semisolid—i. e., are not pourable below 30° C.—as opposed to the relatively lower molecular-weight, pourable liquid or syrupy products. In producing a preferred tackifier, the ratio of the mols of aldehyde to the mols of phenol in the reaction product should range from a lower limit of about 0.75 to 1.0 to an upper limit of approximately 1.0 to 1.0.

EXAMPLE 1

Fifty grams of para-tertiary-butylphenol, 32 grams of 37 per cent formaldehyde, and 1 gram of concentrated hydrochloric acid were slowly heated to reflux temperature and then heated at the reflux temperature for two hours. The water and excess formaldehyde were distilled off, and then the temperature of the residue was raised rapidly to 200° C. The resin was poured from the reaction flask into a small evaporating dish. The product was a friable solid at room temperature and was a light brown color. It was completely soluble in acetone and benzene.

The resin so produced was compounded with GR-S, etc., according to the following formulae by milling the ingredients together. A coal-tar-oil softener was used.

Formula 1

| | |
|---|---|
| GR-S | 100 |
| Tackifier | 5 |
| Softener | 5 |

Formula 2

| | |
|---|---|
| GR-S | 100 |
| Tackifier | 5 |
| Softener | 5 |
| Zinc rosinate | 5 |

Formula 3

| | |
|---|---|
| GR-S | 100 |
| Tackifier | 5 |
| Softener | 5 |
| Zinc rosinate | 5 |
| Channel black | 30 |

The resulting compositions had good tack. A composition similarly formulated but omitting the softener had somewhat less tack although the improvement in tack was very considerable over a similar compound containing none of the tackifier. The increase in tack obtained by compositions which include a softener is probably attributable to the fact that the stock is smoother. Formula 2, which contained the zinc rosinate, had greater tack than Formula 1. The addition of channel back, as was to be expected, reduced the tack slightly but it is significant that the tackifier imparted sufficient tack to the black formulation (Formula 3) for tire-building purposes.

EXAMPLE 2

Seventy-five grams of p-sec-butylphenol and 30 grams of acetaldehyde were dissolved in 75 milliliters of benzene. Five grams of benzene sulfonic acid were added as the catalyst, and the reaction mixture was heated at gentle reflux for 2 hours. After cooling, 3 grams of concentrated sulfuric acid were added, and the refluxing was continued for an additional 7 hours. The benzene solution of the resin was washed thoroughly with water. The solvent was almost completely removed by heating on a steam plate for 3 hours, and the process was completed by heating at 110° C. for 3 hours. Eighty grams of a solid resin were obtained, the softening point of which was approximately 93° C.

The above resin was compounded according to the following formulae:

Formula 4

| | |
|---|---|
| GR-S | 100 |
| Resin of Example 2 | 10 |

Formula 5

| | |
|---|---|
| GR-S | 100 |
| Resin of Example 2 | 10 |
| Channel black | 30 |

Formula 4 was found to have excellent tack, particularly when some pressure was applied to the contacting surfaces. Formula 5 had excellent tack which was very slightly less than that of Formula 4. The tack of Formula 5 was sufficient for tire-building purposes, however.

EXAMPLE 3

Eighty-two grams of o-tert-amylphenol and 37.5 grams of 40 per cent formaldehyde were mixed, and then 5 grams of concentrated sulfuric acid added to catalyze the reaction. The reaction mixture was heated during stirring at 90–100° C. for 3½ hours. The mixture was then cooled. 5 grams of 40 per cent formaldehyde were added, and heating at 90–100° C. was continued for an additional 2 hours. The water was then decanted and the resinous product heated on the steam plate for 1 hour. The resin was cooled, ground, neutralized, and washed. After drying, a brown resin was obtained which was solid at room temperature.

The resin was tested in the following formulae:

Formula 6

| | |
|---|---|
| GR-S | 100 |
| Resin of Example 3 | 10 |

Formula 7

| | |
|---|---|
| GR-S | 100 |
| Resin of Example 3 | 10 |
| Channel black | 30 |

In both Formula 6 and Formula 7 excellent tack was obtained.

The invention is not limited to the specific examples and proportions given therein but includes the various equivalent reaction products and synthetic rubbers above indicated. Modifications may be made in the disclosure without departing from the scope of the appended claims.

What I claim is:

1. A tacky composition which comprises uncured, rubber-like copolymer of butadiene and styrene which includes as a tackifier a reaction product of (1) 0.75 to 1.0 mole of an aldehyde containing from one to not more than four carbon atoms and (2) 1 mole of a phenol which contains in a position other than the meta position a nonaromatic hydrocarbon radical containing about three to about eight carbon atoms, which reaction product possesses a molecular weight sufficiently high that said product is not pourable below 30° C.

2. A tacky composition which comprises uncured, rubber-like copolymer of butadiene and styrene and includes as a tackifier the reaction product of 0.75 to 1.0 mole of formaldehyde and 1 mole of a phenol which contains in the para position a nonaromatic hydrocarbon radical containing about three to about eight carbon atoms, which reaction product possesses a molecular weight sufficiently high that said product is not pourable below 30° C.

3. The process of rendering tacky an uncured, rubber-like copolymer of a conjugated diene and a vinyl aromatic compound which comprises mixing the same with a reaction product of (1) 0.75 to 1.0 mole of an aldehyde containing from one to not more than four carbon atoms and (2) 1 mole of a phenol which contains in a position other than the meta position a nonaromatic hydrocarbon radical containing about three to about eight carbon atoms, which reaction product is obtained by heating and possesses a molecular weight sufficiently high that said product is not pourable below 30° C.

4. The process of rendering tacky an uncured, rubber-like copolymer of butadiene and styrene which comprises mixing the same with a reaction product of (1) 0.75 to 1.0 mole of an aldehyde containing from one to not more than four carbon atoms and (2) 1 mole of a phenol which contains in a position other than the meta position a nonaromatic hydrocarbon radical containing about three to about eight carbon atoms, which reaction product is obtained by heating and possesses a molecular weight sufficiently high that said product is not pourable below 30° C.

5. The process of rendering tacky an uncured, rubber-like copolymer of butadiene and styrene which comprises mixing the same with a reaction product of 0.75 to 1.0 mole of formaldehyde and 1 mole of a phenol which contains in the para position a nonaromatic hydrocarbon radical containing about three to about eight carbon atoms, which reaction product is obtained by heating and possesses a molecular weight sufficiently high that said product is not pourable below 30° C.

6. A tacky composition which comprises uncured, rubber-like copolymer of butadiene and styrene and includes as a tackifier the reaction product of 0.75 to 1.0 mole of formaldehyde and 1 mole of p-tert-butylphenol which reaction product is obtained by heating and possesses a molecular weight so high that said product is not pourable below 30° C.

7. A tacky composition which comprises uncured, rubber-like copolymer of butadiene and styrene and includes as a tackifier the reaction product of 0.75 to 1.0 mole of acetaldehyde and 1 mole of p-sec-butylphenol which reaction product is obtained by heating and possesses a molecular weight so high that said product is not pourable below 30° C.

8. A tacky composition which comprises uncured, rubber-like copolymer of butadiene and styrene and includes as a tackifier the reaction product of 0.75 to 1.0 mole of formaldehyde and 1 mole of o-tert-amylphenol which reaction product is obtained by heating and possesses a molecular weight so high that said product is not pourable below 30° C.

9. The process of rendering tacky an uncured, rubber-like copolymer of butadiene and styrene which comprises mixing the same with the reaction product of 0.75 to 1.0 mole of formaldehyde and 1 mole of p-tert-butylphenol which reaction product is obtained by heating and possesses a molecular weight so high that said product is not pourable below 30° C.

10. The process of rendering tacky an uncured, rubber-like copolymer of butadiene and styrene which comprises mixing the same with the reaction product of 0.75 to 1.0 mole of acetaldehyde and 1 mole of p-sec-butylphenol which reaction product is obtained by heating and possesses a molecular weight so high that said product is not pourable below 30° C.

11. The process of rendering tacky an uncured, rubber-like copolymer of butadiene and styrene which comprises mixing the same with the reaction product of 0.75 to 1.0 mole of formaldehyde and 1 mole of o-tert-amylphenol which reaction product is obtained by heating and possesses a molecular weight so high that said product is not pourable below 30° C.

12. The process of rendering tacky an uncured, rubber-like copolymer of a conjugated diene and a vinyl aromatic compound which comprises mixing the same with a relatively small amount of a reaction product of (1) 0.75 to 1.0 mole of an aldehyde containing from one to not more than four carbon atoms and (2) a phenol which contains in a position other than the meta position a nonaromatic hydrocarbon radical containing about three to about eight carbon atoms, which reaction product is obtained by heating and possesses a molecular weight sufficiently high that said product is not pourable below 30° C., and what is also a relatively small amount of a metallic salt of the group consisting of zinc, iron, calcium, and cadmium salts of rosin acids, hydrogenated rosin acids, dehydrogenated rosin acids, and tall oil acids.

13. The process of rendering tacky an uncured, rubber-like copolymer of a conjugated diene and a vinyl aromatic compound which comprises mixing the same with a relatively small amount of a reaction product of (1) 0.75 to 1.0 mole of an aldehyde containing from one to not more than four carbon atoms and (2) 1 mole of a phenol which contains in a position other than the meta position a nonaromatic hydrocarbon radical containing about three to about eight carbon atoms, which reaction product is obtained by heating and possesses a molecular weight sufficiently high that said product is not pourable below 30° C., and what is also a relatively small amount of zinc rosinate.

14. A tacky composition which comprises an uncured, rubber-like copolymer of a conjugated diene and a vinyl aromatic compound which includes as a tackifier a reaction product of (1) an aldehyde containing from one to not more than four carbon atoms, and (2) a phenol which contains in a position other than the meta position a nonaromatic hydrocarbon radical containing about three to about eight carbon atoms, the ratio of the mols of aldehyde to the mols of phenol in the reaction product ranging from a lower limit of 0.75 to 1.0 to an upper limit of 1.0 to 1.0, which reaction product is obtained by heating and possesses a molecular weight sufficiently high that said product is not pourable below 30° C.

15. A tacky composition which comprises an uncured, rubber-like copolymer of a conjugated diene and a vinyl aromatic compound which includes as a tackifier a reaction product of (1) an aldehyde containing from one to not more than four carbon atoms, and (2) a phenol which contains in a position other than the meta position a nonaromatic hydrocarbon radical containing about three to about eight carbon atoms, which reaction product is obtained by refluxing the reactants which are present in the reaction mixture in the ratio of 0.75 to 1.0 mol of aldehyde to 1.0 mol of phenol, the reaction product having a molecular weight sufficiently high that said product is not pourable below 30° C.

16. A tacky composition which comprises an uncured, rubber-like copolymer of a conjugated diene and a vinyl aromatic compound which includes as a tackifier a reaction product of (1) 0.75 to 1.0 mole of an aldehyde containing from one to not more than four carbon atoms, and (2) 1 mole of a phenol which contains in a position other than the meta position a nonaromatic hydrocarbon radical containing about three to about eight carbon atoms, which reaction product is obtained by heating and possesses a molecular weight sufficiently high that said product is not pourable below 30° C. and is present in the composition in an amount equal to about five to ten parts of the copolymer.

17. A tacky composition which comprises an uncured, rubber-like copolymer of a conjugated diene and a vinyl aromatic compound which includes as a tackifier a reaction product of (1) an aldehyde containing from one to not more than four carbon atoms, and (2) a phenol which contains in a position other than the meta position a nonaromatic hydrocarbon radical containing about three to about eight carbon atoms, which reaction product is obtained by refluxing the reactants and contains the reactants in the ratio of about 0.75 to 1.0 mol of aldehyde to 1.0 mol of phenol and possesses a molecular weight sufficiently high that said product is not pourable below 30° C. and is present in the tacky composition in an amount equal to about five to ten per cent by weight of the copolymer.

HARRY E. ALBERT.

REFERENCES CITED

The following references are of record in the file of this patent:

UNITED STATES PATENTS

| Number | Name | Date |
| --- | --- | --- |
| 2,410,623 | Ballard | Nov. 5, 1946 |

Certificate of Correction

Patent No. 2,476,824                                    July 19, 1949

HARRY E. ALBERT

It is hereby certified that errors appear in the printed specification of the above numbered patent requiring correction as follows:

Column 3, line 32, for the word "back" read *black*; column 5, line 67, after "(2)" insert *1 mole of*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*